(No Model.)
J. J. JOHNSTON.
SKILLET.
No. 265,611. Patented Oct. 10, 1882.
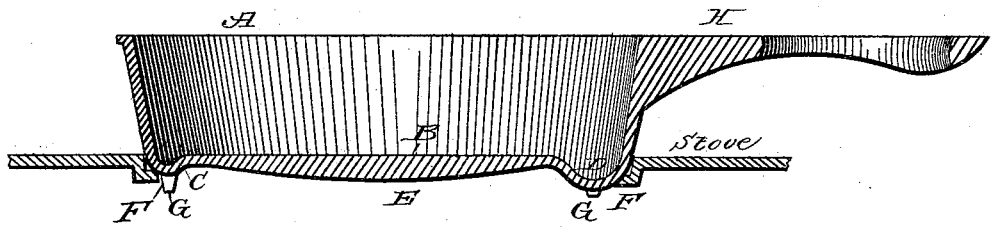
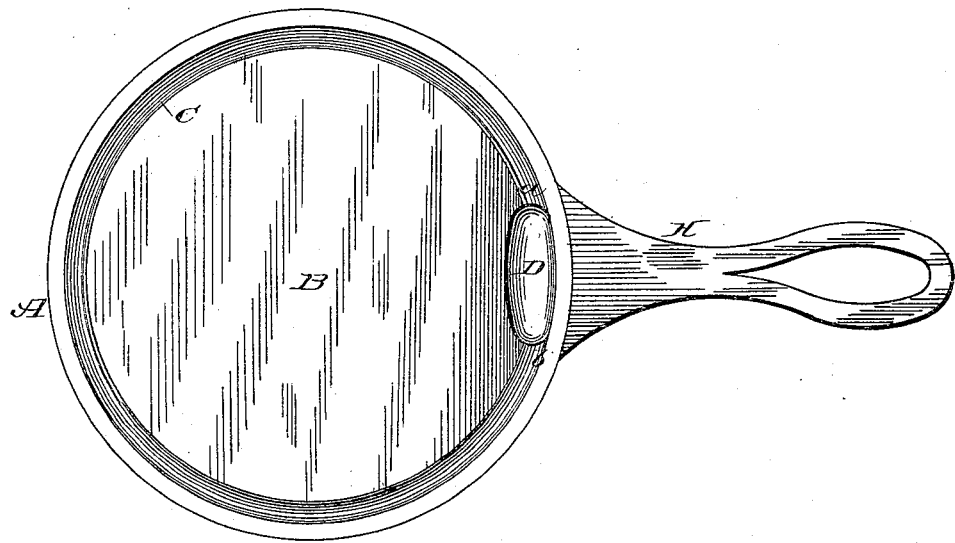
WITNESSES:
Fred. G. Dieterich
Jno. W. Stockett
INVENTOR.
James J. Johnston

UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

SKILLET.

SPECIFICATION forming part of Letters Patent No. 265,611, dated October 10, 1882.

Application filed February 23, 1882. (No model.)

*To all whom it may concern:*

Be it known that I, JAMES J. JOHNSTON, of Columbiana, in the county of Columbiana and State of Ohio, have invented a certain new and useful Improvement in Skillets; and I do hereby declare that the following is a full, clear, and exact description thereof, reference being had to the accompanying drawings, and to the letters of reference marked thereon.

My invention relates to an improvement in skillets; and it consists in making the upper surface of its bottom a horizontal plane and the under sides of said bottom with a central convexity surrounded by a convex circle, the upper surface of which is concave, forming a groove in the bottom at the lower and inner edge of the sides of the skillet, which groove communicates with a drip-reservoir, as will hereinafter more fully and at large appear.

To enable others skilled in the art to which my invention is most nearly connected to make and use it, I will proceed to describe its construction and operation.

In the accompanying drawings, which form a part of this specification, Figure 1 is a vertical section of my improvement in skillets. Fig. 2 is a top view of the same.

Reference being had to the accompanying drawings, A represents the skillet, the upper surface of the bottom of which is a horizontal plane, B, which is surrounded with a groove, C, which communicates at *a b* with the drip-receptacle D. The under surface of said bottom is made convex, as indicated at E, surrounded with a convex circle, F, which convex circle is provided with feet G. The skillet is furnished with a handle, H, and is of that class of skillets known as "stove-skillets," and is represented in Fig. 1 in position on the stove.

The following are the advantages of my improvement in skillets. By making the bottom convex on its under surface it will be of gradually-increased thickness from the inner edge of the groove C to the center of the bottom, thereby causing the bottom to be uniformly heated, and by having the groove C surrounding the bottom the drippings in the frying of meat will collect in the groove C, and flow around it into the drip-reservoir D, from which it can be dipped for the purpose of basting the meat while in the process of frying. In the frying of meat or the baking of flannel or buckwheat cakes it is advantageous to have the bottom of the skillet a horizontal plane, and of uniform heat from the center to its periphery, which will obviate the necessity of the housewife turning and changing the position of the skillet upon the stove for the purpose of securing this result, which is never accomplished with any degree of satisfaction; and the drip-chamber will obviate the necessity of tilting the skillet for the purpose of collecting the drippings or fryings for basting purposes.

Having thus described my invention, what I claim as new, and desire to secure by Letters Patent, is—

In a skillet, a bottom the upper surface of which is a horizontal plane surrounded by a groove, C, which communicates with a drip-receptacle, D, the under surface of said bottom being convex, substantially as and for the purpose set forth.

JAMES J. JOHNSTON.

Witnesses:
   T. D. D. OURAND,
   FRED. G. DIETERICH.